United States Patent [19]
Silverman et al.

[11] Patent Number: 4,464,566
[45] Date of Patent: Aug. 7, 1984

[54] ACCESS SECURITY CONTROL

[76] Inventors: Daniel Silverman, 5969 S. Birmingham Ave., Tulsa, Okla. 74105; Everett A. Johnson, 15 S. Prospect Ave., Park Ridge, Ill. 60068

[21] Appl. No.: 427,588

[22] Filed: Sep. 29, 1982

Related U.S. Application Data

[63] Continuation of Ser. No. 233,885, Feb. 12, 1981, Pat. No. 4,395,628, which is a continuation of Ser. No. 32,404, Apr. 23, 1979, Pat. No. 4,303,852, which is a continuation-in-part of Ser. No. 752,912, Dec. 21, 1976, Pat. No. 4,150,781, which is a continuation-in-part of Ser. No. 495,632, Aug. 8, 1975, Pat. No. 3,999,042, which is a continuation-in-part of Ser. No. 272,739, Jul. 18, 1972, Pat. No. 3,829,661, which is a continuation-in-part of Ser. No. 74,066, Sep. 21, 1970, Pat. No. 3,677,465.

[51] Int. Cl.³ .............................................. G06K 5/00
[52] U.S. Cl. ................................... 235/382; 235/454; 235/457
[58] Field of Search ............... 235/381, 382, 454, 458, 235/494, 457; 340/825.31, 825.34

[56] References Cited
U.S. PATENT DOCUMENTS
4,303,852 12/1981 Silverman ........................... 235/382

Primary Examiner—Harold I. Pitts
Attorney, Agent, or Firm—Everett A. Johnson

[57] ABSTRACT

This invention describes a system for access control, wherein a control card is presented to a control means. If the control card is authenticated, then access is gained. If it is not authenticated, access is not gained, the control card is retained, and an alarm may be sounded.

The control card contains at least two means; (1) machine readable indicia identifying the card, and (2) a random pattern of micro spots, which pattern is derived (by direct copying—such as by focussed laser beam) from one of a plurality of different patterns, retained in a bank of such micro patterns, each such micro pattern identified by, and selectable in accordance with, different unique indicia, identical with the machine readable indicia on said cards.

In use the control card is introduced into the control means and the indicia are read. Master micro pattern corresponding to the indicia is selected from the bank. The card micro pattern and master micro pattern are compared. If the comparison okay, the card is authenticated.

9 Claims, 10 Drawing Figures

ACCESS SECURITY CONTROL

CROSS REFERENCE TO RELATED PATENT AND APPLICATIONS

This is a continuation of Ser. No. 233,885, now U.S. Pat. No. 4,395,628, filed Feb. 12, 1981, as a continuation of Ser. No. 32,404, now U.S. Pat. No. 4,303,852, filed Apr. 23, 1979 as a continuation in part of Ser. No. 752,912, now U.S. Pat. No. 4,150,781, filed Dec. 21, 1976, as a continuation in part of their application Ser. No. 495,632, now U.S. Pat. No. 3,999,042, filed Aug. 8, 1974, as a continuation in part of Ser. No. 272,739, filed July 18, 1972, now U.S. Pat. No. 3,829,661, entitled ACCESS CONTROL SYSTEM, which in turn is a continuation in part of their earlier antecedent application Ser. No. 74,066, filed Sept. 21, 1970, now U.S. Pat. No. 3,677,465.

A related patent is our U.S. Pat. No. 3,818,190, granted June 18, 1974, on our application Ser. No. 272,686, filed July 17, 1972, entitled AUTHENTICATION OF ACCESS TO INFORMATION RECORDS.

BACKGROUND OF THE INVENTION

This invention is in the field of control cards for gaining access. More particularly it is for gaining access to a restricted area, or access to restricted material or papers, or access to money, tickets, checks and the like.

In the prior art there have been many types of control cards described. All of these attempt, in one way or another, to provide some crucial test, which can be performed on the card so as to determine whether it is authentic, or a copy or forgery. All of the physical properties of the prior art cards were capable of being copied, and therefore the tests of validity or authentication were of little value.

SUMMARY OF THE INVENTION

It is a principle object of this invention to provide an access control system which is selective and which is extremely difficult or impossible to duplicate. It is a further object of this invention to provide an access control system which is self protective in that it has plural means to detect forgeries.

These and other objects are realized and the limitations of the prior art devices are overcome in this invention, in which the authentication is obatined by precise comparison of a random spot pattern with an identical one, from which the first one was derived. The spots in the pattern are microspots, too small to be seen with the naked eye, and recorded in a suitable sheet material by copying through microperforations in a master micro pattern, by means of a focussed laser beam.

Because of the extremely small size of the spots, the pattern can not be copied by a stop-position-print system.

Furthermore the sheet material must have a thickness and melting point such that it will withstand, without melting, the passage of a focussed laser beam of a selected intensity.

The pattern can not be copied photographically, since the photographic material will not withstand the laser beam.

The pattern can not be copied photographically and etched, since the microperforations will not be of the correct size.

They can only be copied from the mater pattern by passage of a focussed laser beam over the microperforations in the master pattern card.

In the use of the control card, it is inserted into the control unit.

It is then advanced to a first station where the indicia are read. At this point the indicia are compared to a prior list of indicia which are indicated as unacceptable. If the indicia are okay it then goes to the second station.

At the Second Station the card is scanned by a focussed laser beam of a specified intensity level. This level is just below the level which will burn the pattern sheet of the valid cards. If the pattern sheet of the card is not burned, as evidenced by a photoelectric system for detecting major perforations in the pattern sheet, the card then goes to the third station.

At the Third Station the micro pattern on the card is compared to a selected master pattern which correponds to, and has been selected from a bank of master patterns in accordance with the indicia read from the card.

Two tests are made at this station. The first is to compare the pattern on the card with the master pattern. If this checks, then the second test is made.

In the second test, the sizes of the microperforations in the pattern sheet are compared to the size of the microperforations in the master card. This can be done by slowly shifting the position of one pattern with respect to the other, at a selected constant speed, and measuring the time that light passes through any selected spot, as plurality of spots.

If the card passes this test, then it is considered authentic and the appropriate operative mechanism is activated to provide the access requested. Also the card is returned to the owner who first inserted into the control apparatus.

Not all of these tests may be required. The principal test, is of course, the comparison of the patterns in station 3 test (a), the master pattern having been selected on the basis of indicia read in the First Station. Also, other tests may be provided, including, for example, comparing a photograph on the card with the person presenting the card, or comparing finger prints, etc.

BRIEF DESCRIPTION OF THE DRAWINGS

These and other objects of this invention and a better understanding of the principles and details of the invention will be evident from the following description taken in conjunction with the appended drawings, in which.

DESCRIPTION OF THE PREFERRED EMBODIMENT

Figure 1:
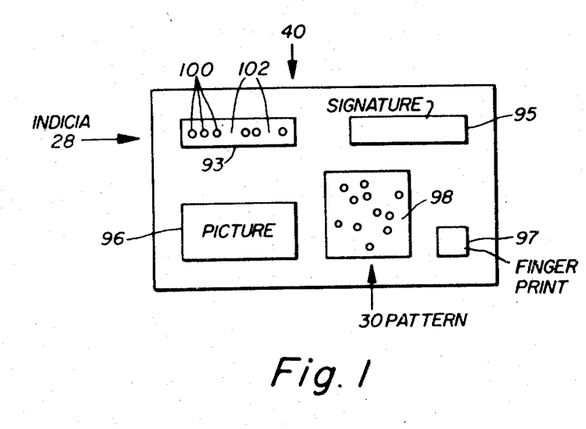
FIG. 1 illustrates a type of access card useful in this system.
Figure 2:
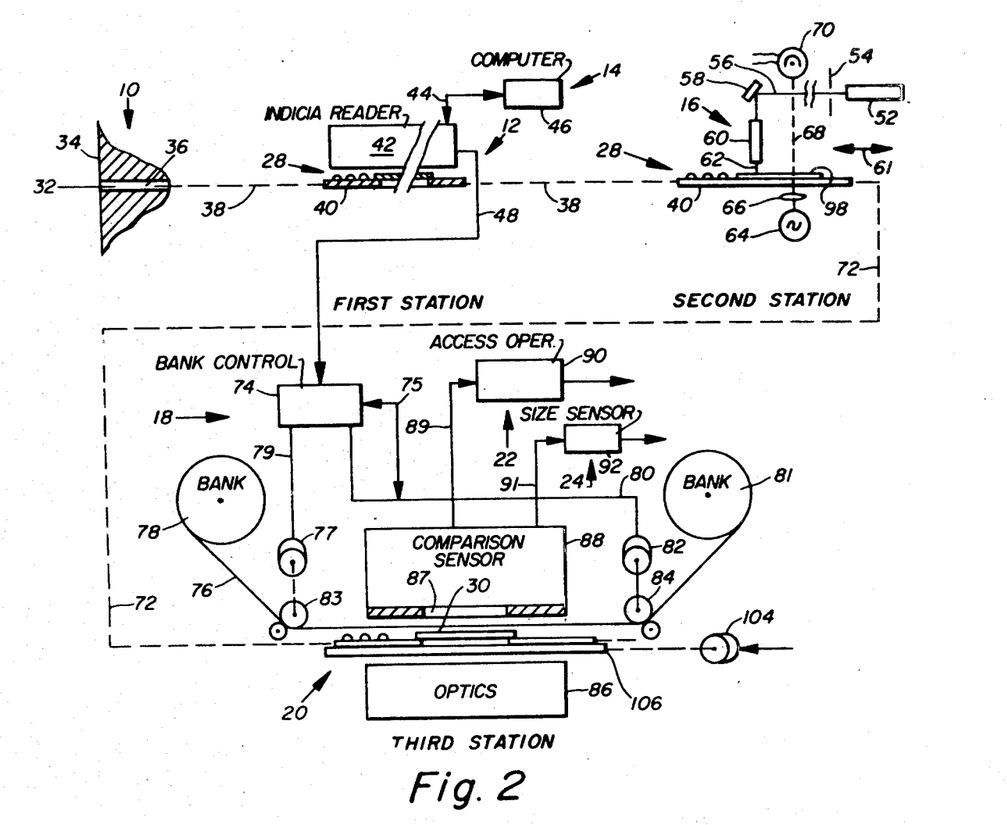
FIG. 2 illustrates the preferred embodiment of the access system of this invention.

Referring now to the drawings, numeral 10 indicates generally the card input station, numeral 12 indicates generally the First Station, numeral 14 indicates computer apparatus to check the indicia against a prepared list of indicia, numeral 16 indicates the Second Station, numeral 18 the Third Station, 20 indicates the pattern comparison means, 22 the operative means responsive to the validation means, 24 the perforation size measurement means, 26 the access control card, 28 the machine readable indicia on the control card, and 30 the pattern of microperforations by means of which the control card will be validated or authenticated.

This application is a continuation-in-part of our copending application, Ser. No. 74,066, filed Sept. 21, 1970, entitled; Method and Apparatus for Authentication of Information Records, now U.S. Pat. No. 3,677,465, which is made part of this application, by reference, and will be depended on for much of the detail of the apparatus to be described.

Also, there will only be schematic diagrams given of the physical apparatus, such as the case, the card handling means, and the operative means which actually accomplishes the access. This invention does not involve any specific means for housing the electronic and photo apparatus, or the card handling apparatus, and since there are a number of such devices discribed in the patent literature, such as for example, U.S. Pat. Nos. 3,571,957, issued Mar. 23, 1971, 3,620,590 issued Nov. 16, 1971, 3,629,834, issued Dec. 21, 1971, and others, it is not deemed necessary to describe the details of construction or operation, since those are well known to one skilled in the art.

FIG. 1 indicates a card, token, sheet, web or other medium for carrying the specific information required in this invention. For convience, we will call this means a "card", although, as is well known it can be in any one of many different forms.

There are two principal areas of the access control card, or access card, or control card, or simply card 26, that carry important information. The first space 28 carries indicia which are machine readable. These can be perforations, or embossed characters representing specific information, such as account number or name or address of the card owner, or other information. The group of characters 100, and spaces 102 that make up the indicia represent specific information. The words indicia, or characters, will represent the physical markings on the card, or the specific information they uniquely represent. The indicia on each card issued are all different, and associated with each indicia there is a different unique pattern, which is marked on the card in a second area 30.

The pattern 30 is made up of a random distribution of a plurality of spots, which are microperforations in a thin opaque metal layer. As described in our copending U.S. Pat. No. 3,677,465, the material 98 which carries the pattern 30 can be a thin evaporated layer of metal or a transparent base material such as clear plastic.

For each card carrying its unique pattern 94 there is an identical master pattern of microperforations in a metal layer. This master pattern can be a self supporting metal sheet or film, or a thin metal coating on a transparent plastic base, etc. The microperforations are preferably prepared in the master pattern by means of a pulsed focussed beam of laser radiation of a selected level $L1$ of intensity.

The patterns 94 in the sheets 98 are precise copies of the master patterns made by superimposing the master pattern material on top of the card material 98, and passing a continuous beam of focussed laser energy through the microperforations in the master pattern, to the underlying metal layer of the sheet 98, and burning microperforations in the same pattern as in the master pattern.

As explaned in U.S. Pat. No. 3,677,465 it is necessary that the metal layer of the master pattern be of higher melting point, and/or thicker, than the metal layer of the sheet 98 of the card. Thus, when the intensity of the continuous focussed beam is set at a value of intensity level $L2$ where $L2$ is less than $L1$, this beam will not affect the metal of the master pattern, but will burn holes in the sheet 98.

There is also a third intensity level $L3$, where $L3$ is less than $L2$, which when scanned across the material 98 will not affect the metal layer of the material 98.

On the record card 40 there may be other areas 95, 96, 97, etc. Which may include the signature of the card owner, his picture, or his fingerprint, or other identifying information, which can be further used to authenticate the card and the bearer of the card. Such additional information is well known in the art and forms no part of this invention, and will not be described further.

Referring now to FIG. 2, the card of FIG. 1 is inserted into an opening 32 in a casing 34 that houses a plurality of test or measuring stations. As mentioned above, the particular housing, or means of transport of the card, etc., form no part of this invention and reference is made to the prior art for such details.

The card entered at 32 is transported through passage 36 by means 38, well known in the art, to the First Station 12. Here the card 40 is presented with means 42, well known in the art, for reading the markings 28, and determining the information corresponding to the indicia. This information is sent to a computer means 46, which when it receives the indicia read from the card compares the indicia with a preselected list, bank or tape of indicia, to see if that specific information is listed in the bank or on the tape.

This list could be, for example, all indicia on cards lost, stolen, or otherwise declared invalid. If the specific indicia 93 is found on that list, the card is rejected and falls into a receptacle inside the housing (not shown). If desired, an appropriate notice is given to the person who inserted the card, that it is invalid and is being confiscated. At the same time the indicia read by 42 also goes by line 48 to the Third Station, for a purpose to be described later.

If the indicia read by 42 is not on the list at 46, then the card 40 progresses to the Second Station 16. Here two tests are performed. The first test is to check the nature of the material of the sheet 98. A laser 52 passes light through an intensity control means 54, via beam 56 to a mirror 58 and through an optical means 60 to focus the beam 62 onto the top surface of the material 98. The intensity level is adjusted to the level L3, which is just below the level L2, where it will burn the metal layer. With the level at L3, the beam is scanned across the pattern 30, in accordance with arrows 61.

If the material of the sheet 98 is not the proper material, for example, if it is a photographic emulsion, then it will not support the beam of intensity level L3, and parts or all of the opaque material 98 will be burned away. When this happens, as the beam is scanned in accordance with the arrows 61, openings in the opaque layer will be formed.

The second test is then applied. This involves passing light from a source 64 through lens 66, through the pattern area 30 and to a photoelectric sensor 70. If no light passes, it indicates that the material 98 is satisfactory. If light passes, it indicates that the material 98 is a substitute material, and therefore the card is invalid, and it is confiscated.

If the card 40 passes the tests at Station 2, it then goes to Station 3. Here there is a bank of master patterns. These may be on separate cards or sheets, or may conveniently be on a reel or strip of material 76, with separate frames or areas, each having its unique pattern of microperforations in the metal layer of the strip. Corresponding to each frame, is an index, which correponds to the indicia of that pattern. Thus, when the First Station reads the indicia, this information goes to control means 74. This control means operates motors 77, 82, which drive reels 78, 81 respectively to position the proper frame, and pattern in an aperture between the rollers 83, 84. Thus the correct master pattern corresponding to the indicia on the card 40 is now displayed in the aperture 87. The control means 74 can be conventional, similar to the many examples of strip films or tapes carrying micropatterns and digital indicia, with means to transport the strip until a desired index is reached, etc.

The card 40 is now sent to the Third Station and positioned so that the pattern 94 is precisely lined up in the aperture 87 so that the two patterns, that is, the master pattern and the card pattern 30, are aligned. Optical means 86, cooperating with sensor means 88 determine if the patterns are identical. If they are not identical, the card 40 is discarded.

The materials of the master pattern and the card pattern are specialized, in that the master material (metal) is of high melting temperature and/or thicker, while the card material (metal) is lower melting temperature and/or thinner. The patterns of microperforations are copied and burned into the card metal by focussed laser beam from the master material. The microperforations in both materials are of exceedingly small size, so that the patterns must be precisely positioned with respect to each other. Reference is made to U.S. Pat. No. 3,677,465 for details on the systems for comparing the two micropatterns. Normal digital reading systems are not practicable since the spots are too small, and the spacings are random. Misalignment of one microperforation by a distance of the order of the diameter, (which may be as small as 0.0005 in.) will cause the comparison means 74 to reject the card.

The purpose of the use of thin metal layers and microperforations, and the transfer of patterns described, is to prevent forged copies from being used. For example, the simplest way to copy the pattern on a card is to make a photographic copy, and that copy (except for changes in dimension) might be used in the comparator 74. However, such a photographic copy will not stand the test of the laser of intensity L3. The only material that will satisfy that test is a metal of the same melting point and thickness as the material 98 used in the card. And the pattern cannot be transferred from the card to the new material by photography. Nor can it be transferred by laser, since the laser of intensity level L2 which would burn microperforations in the new material would also destroy the card material.

However, the pattern could be etched in a suitable metal by photoetching. However, the size of the perforations would not duplicate those of the master card, and this is the reason for the next test.

Figure 3:
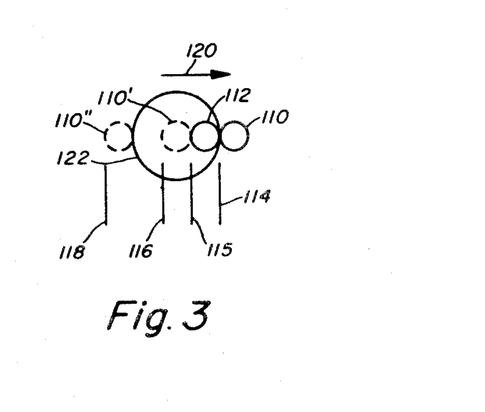
FIG. 3 illustrates the test for perforation size.

In FIG. 2 the card 40 is shown connected to motor 104 by means 106. When the motor 104 is started the card will pass at a constant velocity past the master pattern on the strip. In FIG. 3 we have shown (enlarged) the relationship between a microperforation 110 on the master pattern as the corresponding microperforation 112 in the card passes to the right, in the direction of arrow 120. When the two are tangent at 114, light is just beginning to pass through the two microperforations. Consider for simplicity, that the opening 110 is moving to the left. When the leading edge of 110 gets to position 115, the two microperforations are completely superimposed. Then when it gets to 116, there is no more light passing. Thus the two patterns must be relatively traversed by a distance from 114 to 116, equal to the sum of their diameters.

Now, consider that the card pattern has at least one perforation 122 that is oversize. Then the traverse must be over a distance from 114 to 118, (again the sum of their diameters) which will be larger than the distance 114 to 116. There are well known techniques for measuring small distances, such as measuring time of traverse, etc., this would be done in means 92. Thus it will not be necessary to provide more details since the specific means forms no part of this invention.

If the pattern comparison is okay and the test of size is okay, then the card will have passed all tests, and the card is validated and the operative means 22 is energized to provide the requested access. No detail is provided for the mechanism 22, which can be as simple as a relay to open a locked gate, or as complicated as a device for dispensing currency, providing access to a computer or to a cable TV circuit, credit purchase, etc., since these specific means form no part of this invention and are well know in the art.

While we have indicated means to check the validation of the pattern, and have indicated other means to test the authenticity of the card itself, it will be clear that the apparatus can be operated without carrying out all of the tests.

It will be clear also, that while we call the patterns or the strip 76 the "master patterns", these can be copies of other master patterns in materials of still greater thickness and/or higher melting point.

In the drawing, FIG. 2 illustrates the system as a plurality of successive stations or operations on the control card. The area of the card devoted to indicia is separate from the area devoted to micropattern, and it is clear that the means to read and the means to compare may be situated within the outer boundary of the card. Thus the card need only be positioned in a single location.

Our disclosed invention includes an access control system for selectively controlling access on presentation and authentication of a control card. This card comprises card means, machine readable indicia carried thereby, and unique coded micropattern means thereon. The card authentication means comprises means to read the indicia, and a bank of authenticating master coded micropatterns. Selecting means, responsive to the means to read the indicia, selects the master coded micropattern from the bank corresponding to the coded micropattern on the card means; and means to compare the coded micropatterns on said card means with the master authentication micropattern selected from the bank in response to the read indicia.

The system may further include operative means responsive to said comparison means, said operative means including means to authorize access when the compared patterns correspond. A preferred form includes coded micropattern means comprising an array of microperforations; and the coded micropattern means may include redundant coded patterns.

The system as described above in which said card micropattern is transferred from said master micropattern by focussed laser means of intensity level L2; and including means to scan across said card micropattern with a focussed laser beam of intensity level L3, where L3 is less than L2.

The microperforations may be burned in said master pattern in a metal layer of first melting point and first thickness by scanning with a focussed laser beam of intensity level L0 through microperforations in a supermaster pattern in a third mayer of third melting point and third thickness, where L0 is higher than L2.

Also the system includes means, responsive to said means to read said indicia, to compare said indicia with a preselected list of indicia; and the master micropattern is in a first metal alyer of first melting point and first thickness, and said card micropattern is in a second metal layer of second melting point and second thickness, and said first melting point may be higher than said second melting point and said first thickness may be greater than said second thickness.

The system includes means to compare the sizes of the microperforations in said card micropattern with the sizes of the microperforations in the master pattern.

The fundamental basis of this invention lies in the use of a card having a machine readable indicium and a unique pattern, and a bank having a plurality of indicia and corresponding patterns, and means responsive to the read indicium on the card to select the corresponding pattern, and means to compare the selected pattern and the card pattern.

In this invention the unique pattern is a micropattern of microperforations which can not be read by eye, and not by machine, except by the optical comparison with the bank pattern. To do this the card must be presented where there is a bank of patterns.

Another method in which the pattern is unique and not readable except by selection of a particular pattern in the bank, is to use a photographic hologram on the card, and in the bank a corresponding coded reference beam (see our U.S. Pat. No. 3,807,828). When the hologram on the card is exposed to the coded reference beam, since the hologram was made with that specific coded reference beam, the hologram will be reconstructed and an image of the object of the hologram will be formed. This object could be a point, or plurality of points, of light falling on PE sensors, etc.

Both the hologram card and the micropattern card have great security because of their permanent complex patterns which cannot easily be duplicated. However, they have the limitation that they must be presented adjacent a bank.

There is another type of pattern, such as a magnetic code pattern or a machine readable card, that comprises a series of time spaced pulses, or bit pattern. These can easily be transmitted from a distant reading station to a bank (computer memory) for comparison be well known digital means. However, the magnetic card pattern is not secure, since anyone finding the card can read the pattern and make a corresponding facsimile, by means of which they can enter the bank. This system can be used at great distances from the bank, but has the disadvantages of poor security.

The security can be greatly improved by changing the pattern on the card and in the bank each time the card is used. Thus, the pattern is continually being changed from one to another unique bit pattern, so that a copied card cannot be used unless it is presented before the next use of the original card. Also, the unauthorized use is quickly detected because once the unauthorized card is used, the true or original card cannot be used since the pattern in the bank has been changed, by the use of the authorized card.

While the invention has been described with a certain degree of particularity it is manifest that many changes may be made in the details of construction of the arrangement of components, it is understood that the invention is not to be limited to the specific embodiments set forth herein by way of exemplifying the invention, but the invention is to be limited only by the scope of the attached claim or claims, including the full range and equivalency to which each element or step thereof is entitled.

Embodiments of our invention include an access security system for monitoring access by authentication of a control member on presentation which includes a bank of unique authenticating master coded micropatterns of micro altered areas of web means, together with a corresponding group of macropatters of machine readable indicia, each of the macro indicia corresponding to selected micropatterns and providing an index thereto, and a plurality of control members, each such member having at least one of said macropatterns of machine readable indicia and the corresponding coded micropattern of micro altered areas. Means are included for authenticating the presented control member, such means comprising means for reading the macro patterns, means responsive to the reading means, including means for selecting the corresponding micropattern from said bank indexed by said macro indicia; and means for comparing the micropattern on said member with the indexed micropattern in said bank.

The disclosed access security system may also include means for authorizing access when the compared micropatterns correspond; and means for the delivery of an item identified by the coded micropattern, and wherein the item delivered may comprise currency.

Further embodiments of our invention include means for comparing an array of at least two micropatterns on the control member, and wherein the macro indicia indexes a corresponding series of micropatterns in the bank; also the micropattern of micro altered areas may comprise an holographic record, with the holographic record being, for example, a photographic hologram adapted to be reconstructed by a coded reference beam.

Another improved access security system includes a plurality of micropatterns in a first array on a control member, means for recognizing the array of micropatterns present, means for reading the micropatterns in the array, and means for substituting for at least one of said micropatterns another micropattern from said bank to provide a second array, whereby the coded security access afforded by the unique control member is revised on each authorized presentation of said member.

A further feature of our access security system is one wherein the micropattern of micro altered areas comprises a series of magnetic spots, and the additional means for changing the arrays thereof on the control member and for recording the change in the bank, the changes being indexed by the macro indicia recognition.

An additional embodiment provides a further means for changing the pattern on the control member and in the bank each time the member is presented, whereby the micropattern is sequentially changed from one to another unique master coded micropattern, thereby precluding the unauthorized use of a facsimile after the next authorized presentation of the original member.

The sequential changes are recorded in the bank and can provide a record of presentations and transactions, and in addition provide a means for security updating of the control member whether or not a transaction is involved.

Figure 4:
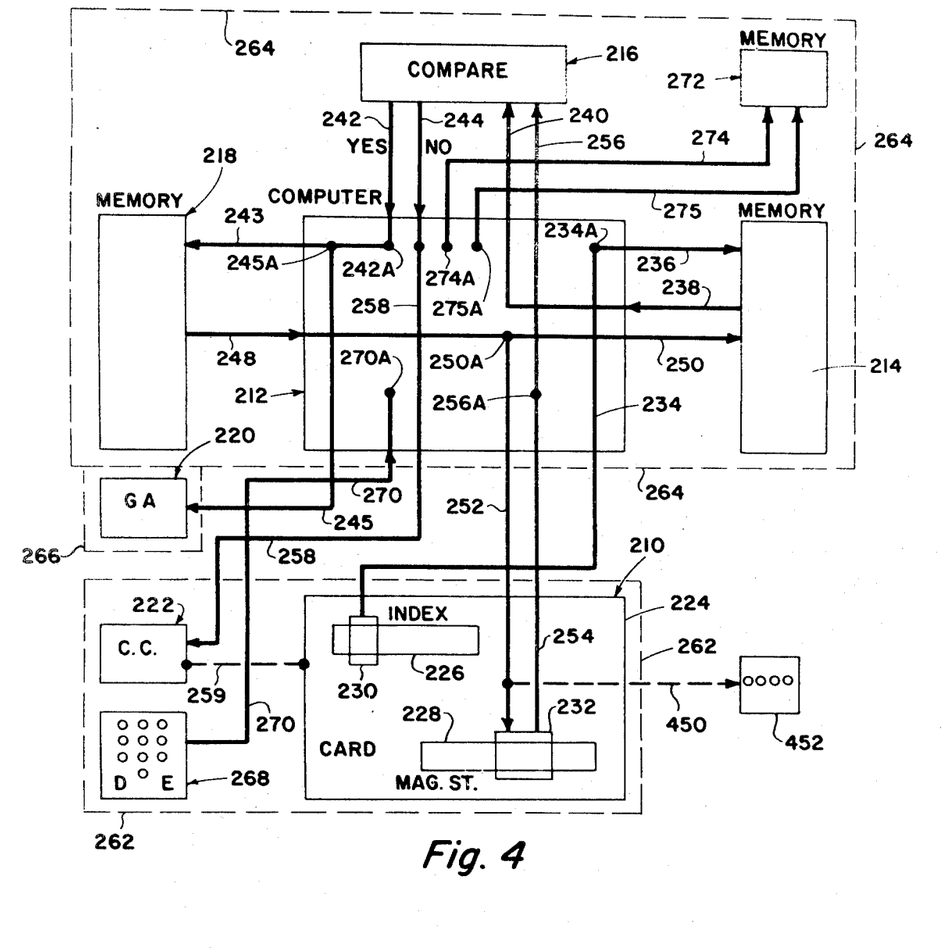
FIG. 4 illustrates an embodiment in which a key, token, or card is provided, which has machine readable macroindicia and a bit pattern of magnetically altered areas on a strip of magnetic material, and a reading means.

Referring now to FIG. 4, there is shown an embodiment in which a key, token, or card 224 is provided, which has machine readable macroindicia 226, and a bit pattern of magnetically altered areas on a strip of magnetic material 228, applied to one surface of the token, key or card 224. The overall card, plus reading means is indicated generally by the numeral 210.

There are many words such as token, key, card, etc. which can be used to identify the object which can be used to gain access. Such objects can be of many different forms, some more suited to certain conditions than to other conditions. One of the most common type of object is a thin stiff card of paper or plastic, and this invention, for convenience, will be described in terms of a card. This is no way constitutes a limitation of the form in which the article, or object, can be used.

The magnetic material 228 is generally applied in the form of a thin layer of magnetic particles, applied to one surface of the card. Such magnetic strip cards are widely used in industry and need not be further described. Also, card readers have been in use to read magnetized bit patterns previously impressed on the strip. Such readers can utilize a conventional magnetic head assembly with one or more heads reading one or more tracks which are moved along the strip and sequentially read the bit patterns on the one or more parallel tracks.

Other types of magnetic recording areas have been used in industry, and can be used in this invention. One of the common types is a circular area, which has a central perforation which serves to position the axis of a rotating head mechanism.

The important point is that a record is provided in which information in the form of a sequential bit pattern can be written, read, and erased and another pattern written, and so on. The bit pattern represents in binary, decimal, or other digital form, a unique number, which is applied to only one card, and is also stored in a bank, or memory 272 in a mini-computer 212 for example. The address in the memory or bank 214 in which that specific number is stored, is the same as the index 226 recorded on the card 224.

Shown in FIG. 4 is the card 224 with index 226 and index reading means 230. Also shown is the magnetic strip or record 228 and the magnetic reading means 232. In general, as shown in FIG. 2, the reading (or comparing) means is in a card handling reading means, adjacent to the position in the card handling means where the card is placed.

In FIG. 4 the rectangle 212 represents a control processing unit or a CPU of a digital computer. It can be a large computer, or an operating terminal of a large computer, or it can be a minicomputer, as is well known in the art.

As peripheral equipment to the CPU (Central Processing Unit) or as elements of the CPU, there is a memory or bank 214 for storing the plurality of unique magnetic bit patterns, or numbers, in storage areas, the addresses of which correspond to the macroindicia on the cards, which carry the corresponding bit patterns.

There is another memory 218 which comprises a storage area for a large number of random or unique numbers, or bit patterns. While this can conveniently be a storage for such numbers, it also can be an arithmetic unit that can calculate random or unique numbers.

There is a means to compare two unique bit patterns 216, which would generally be a part of the arithmetic unit.

There is a means to grant access 220. This can be a remotely operated door latch, or a means to deliver an object from storage in a sales equipment, etc. The objects delivered or sold can be of various types, such as food products, etc. They can also be packets of money, or they can be means to transfer money from one account to another, and so on.

All of these types of activity have been done in the prior art, and commercial equipment is available to these operations subject only to an appropriate electrical signal delivered over means 245.

As previously described, there may also be means 222 to confiscate the card, if under selected circumstances, the card fails to meet certain security requirements.

The equipment shown in FIG. 4 is divided into 3 main parts, defined by dashed outlines 262, 264 and 266. While these may all be at the same location, and even be in a single housing, the system is such that it can be broken into parts such as the three parts outlined.

The dashed outline 262 is the card reading area and includes means to insert a card (as in FIG. 1) 230 to read the macroindicium 226, means 232 to read the magnetic bit pattern on strip 228, and it may contain means 222 to confiscate the card.

The dashed outline 266 is the means to grant access, and may be positioned at any selected point. In fact there may be many such points where access is to be granted.

The dashed outlines 266 and 262 may be combined. That is, the point at which access is gained can be the point where the card 224 is presented, or they can be at different points.

There may be at the position 262 where the card 224 is presented a means 268 for data entry (DE), that is, for entry of numerical data, such as the number corresponding to that at the point at which access is desired. It will be clear also that the data entry means 268 can be used to enter a PIN number, or "personal identification number", by means of which an additional stage of security can be provided.

The dashed outline 264 represents the control means, or CPU, of the system. It will be clear also, that since, in the prior art, computers have been used with large numbers of "terminals", or points where the computer can be accessed, so too, it is possible to have a plurality of boxes 266, representing distant distinct locations where cards can be presented to gain access.

While we speak of gaining access, that is a very generalized term for what can be accomplished with this system. It may, for example be used to actually gain access through a door or gate. It may gain access to any one of a plurality of small storage compartments where articles are stored, such as for sale, such as products or food items, etc. It may be used to gain access to a selected account in a bank, from which money is to be delivered, and an account debited, or it can be the means for controlling transfer of funds from or to a first account, to or from another account, the number of which can be indicated by entry through the data entry means 268, and so on. It can also be used to authenticate a request to gain access to a data bank in a computer from which, when the card is authenticated, data can be reads from that data bank and transferred to another computer, for example.

In this system the purpose is to present a card representing a selected person or account, to have the card authenticated, and when the authentication is completed, have one or more different selected operations carried out.

Such cards have been used in the past, but the security has been poor. For example, having a signature which is examined by eye. Or the security may be dependent only on a PIN number which is punched in by hand into a data entry unit such as 268. Once the PIN number is learned by another person, there is no further security.

In this invention, a much more unique security means is utilized, so that even if the numbers on a card are copied, or a facsimile card is made, the facsimile card can not be used to gain access unless it is presented before the next time that the true card is presented. The unique coded master number is changed on the card 224 and in the bank 214 each time the card is presented and authenticated. If the true owner presents his card and it is authenticated, he knows that no facsimile card has been presented, and also, any previously prepared facsimile card will become ineffective, since the number in the bank has been changed. This will be clear as the description proceeds.

In FIG. 4 the index reader 230 is connected to the computer 264, and in particular to the CPU 212, by lead 234. The index number read by 230 goes by lead 234 to the bank memory 214 via lead 236. The binary coded magnetic bit pattern stored in the memory 214 at the address transmitted on lead 236, is returned to the CPU over lead 238. This unique authenticating master coded bit pattern goes by lead 240 to a means to compare or comparator 216.

At the same time, the reading of the binary magnetic bit pattern stored on the strip 228 read by 232 goes by lead 254 to the CPU and by lead 256 to the comparator 216. If the numbers are identical, a signal is sent over the "yes" line 242 and 245 to the means to grant access 220, and the desired operation is carried out, the desired operation having been indicated to the CPU (in case there is more than one) by the data entry means 268.

The "yes" signal over 242 goes also over lead 243 to the memory or table of unique bit patterns, or numbers, 218. A new number is selected and returned by line 248 to the CPU and by line 252 to the write head 232 to be recorded on the magnetic strip 228. The new number also goes by line 250 to be entered into the memory or bank 214 in the address location corresponding to the index 226.

The card and the bank have now been updated with new identical unique numbers. The next time that the card 224 is presented and authenticated another unique master bit pattern or number will be supplied, and so on.

If the means to compare 216 finds, on comparison, that the number from the bank on 240 does not agree with the number on 256 from the card, a "no" signal is sent by way of lines 244 and 258 to the means 222 to confiscate the card. The card is then held in the instrument housing and not returned.

If it is assumed that the card 224 is stolen, or is "borrowed" and the index 226 copied, and the bit pattern is copied onto another card, to form a facsimile card. Such a facsimile card can be used to gain access, only if is is presented before the next presentation of the true card 224. If the true card is presented first, and authenticated, then the number in the bank will be changed. Then when the facsimile card is presented, it will not be authenticated, but will be confiscated.

On the other hand, if the facsimile card is presented before the next presentation of the true card 224, it will be authenticated and its number and the bank's number will be updated. Thus the next time the true card is presented, it will not be authenticated, but will be confiscated. This in itself will be indication that a facsimile card exists. The card owner must then present himself with proper identification to get a new card. Until that time, however, he must report the situation and ask that the number in the bank be changed to ensure that further use of the facsimile card will be prevented.

Security can be maintained by presenting the card at frequent intervals, so that the number in the bank will changed at frequent intervals, and thus hinder the use of a possible facsimile card.

The indicium 226 can be one of many types such as:

(a) a line/bar printed pattern, such as are used on various product packages in stores. The pattern can be read by the optical scanners such as have been developed and manufactured to read these patterns.

(b) an embossed pattern on a non magnetic card, read by electromechanical means, as in the prior art.

(c) perforations in a spot pattern read optically.

Figure 5:
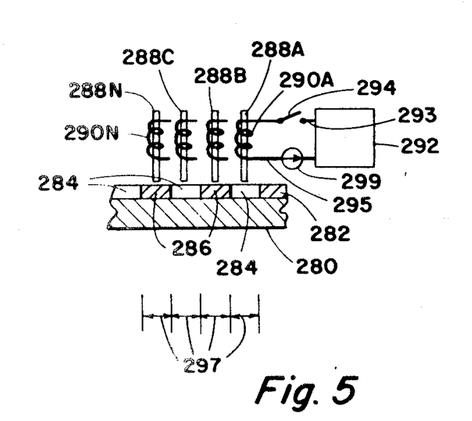
FIG. 5 illustrates a system wherein a type of spot pattern can be read statically by magnetic means.

(d) a permanent magnetic pattern such as illustrated in FIG. 5, and others.

In FIG. 5 is shown a type of spot pattern that can be read statically by magnetic means. There is a non-magnetic paper, or plastic card 280. This has a thin layer or film of magnetic material 282, such as a thin foil of iron, or such. This is perforated in a spaced pattern by means of "perforations" 284 and "non perforations" 286, at a selected spacing 297. There are a plurality of thin rod-like magnetic cores 288A, 288B etc. at the same spacing 297. An a.c. current of selected frequency is applied from oscillator 292 through leads 293, 295, switch 294 to each of the coils 290A, 290N, etc. An ammeter can be used to indicate the current that flows when a selected voltage is applied to the coil. The impedance of the coil will vary depending on whether a perforation or a non-perforation is present at the end of the core. The impedance differences on the coils is dependent on the pattern, and the pattern can be read by measuring the current or voltage, and by other similar means as is well known in the art. The impedance can be measured either simultaneously or sequentially.

Figure 6:
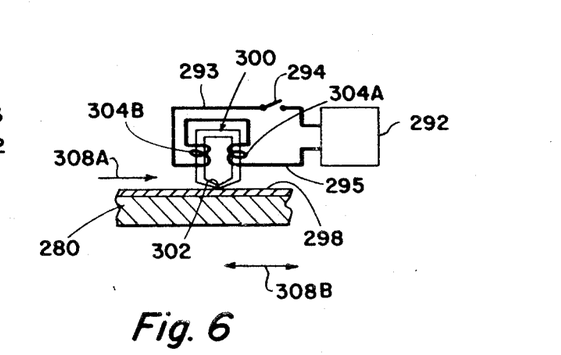
FIG. 6 shows a typical prior art magnetic reading head moved along a magnetic strip.

In FIG. 6 is shown a typical prior art magnetic reading head 300 which is pressed in contact with strip 298 of magnetic material on one surface of the nonmagnetic card 280. Normally the head is moved along the strip at a selected constant rate in accordance with arrow 308A and pulses of current applied to the windings 304A and 304B to create a flux in the gap 302. This magnetizes the magnetic layer 298 in the vicinity of the gap. Then as the head moves another incremental distance another pulse is applied, or no pulse is applied.

The magnetic strip is thus magnetized in a pattern of magnetized spots, which can be read by moving the same head along the strip and detecting the minute voltages induced in the windings. This is all conventional.

What we propose is to have a plurality of fixed spaced heads like 300 in contact with the strip 298 in selected spacing. Then by applying pulses of current to the heads in a selected pattern, either sequentially or simultaneously, while the heads are stationary with respect to the card, a pattern of magnetized spots will be generated.

This pattern of spots can be read by leaving the heads in contact and relatively oscillating the card 280 or the heads, in accordance with arrow 308B. Each time that the head passes over a magnetized spot is will generate in the coil a pulse or a small wavelet of voltage.

Figure 7:
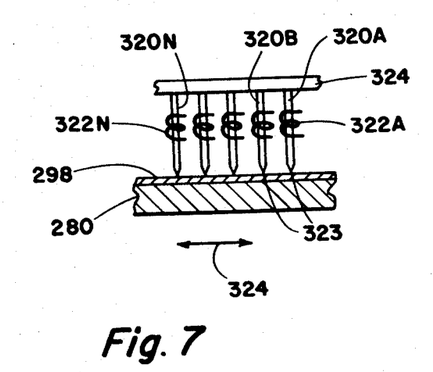
FIG. 7 shows record and read heads of simplified type in accordance with our invention.

As shown in FIG. 7, the record and read heads can be simplified to a simple linear core pressed against the strip. The ends in contact with the strip 298 can be points. The other ends of the cores can go to a magnetic yoke, for flux return, etc. as is well known in the art. Here again the strip is magnetized by passing a pulse of current through the coils 322 while the card and heads are stationary, at the midpoint of the oscillation 308B. Then by relatively oscillating the card, an a.c. voltage will be generated in the coils.

If desired, the polarity of the current pulses can determine whether a bit recorded is a "1" or a "0". Then the phase of the generated voltage will be an indicator of the "1" or "0".

Figure 8:
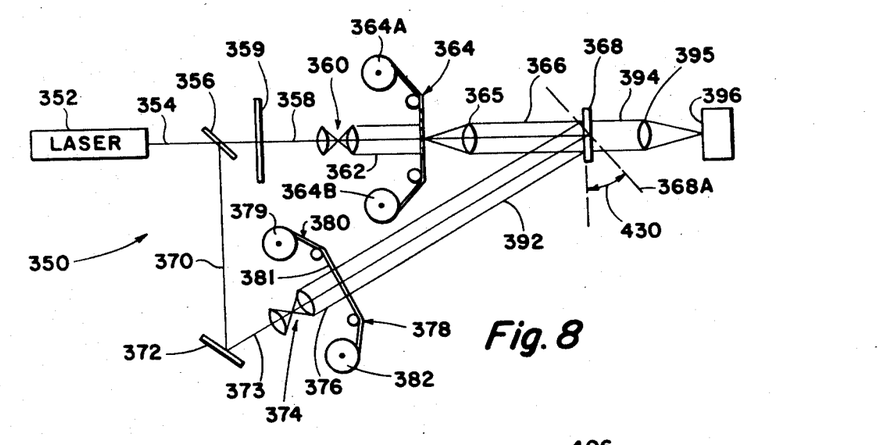
FIG. 8 illustrates schematically apparatus for the preparation of a hologram, using a spot pattern object, and an amplitude coded reference beam.
Figure 9:
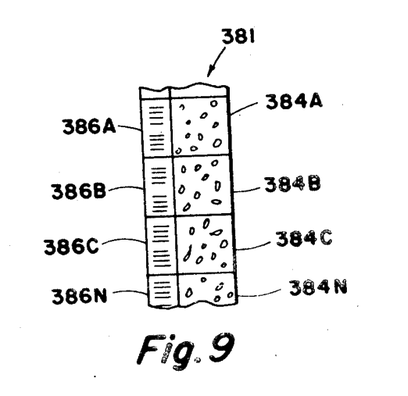
FIG. 9 shows a film strip means for coding reference beams.
Figure 10:
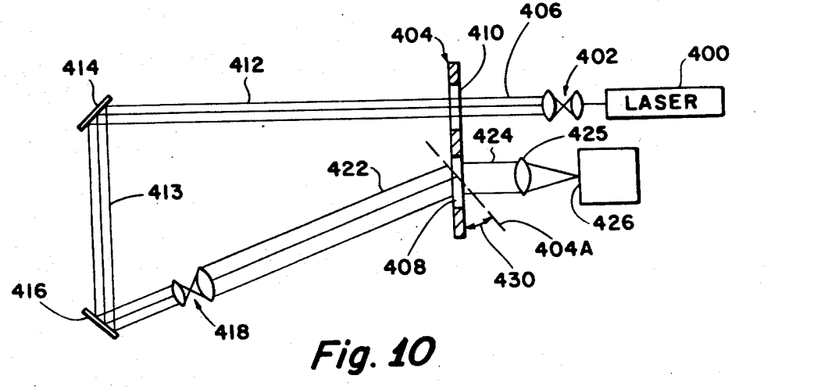
FIG. 10 Illustrates another embodiment in which the card carries a unique machine readable index, a reference beam coding pattern, and an object beam coded by a unique spot pattern of FIG. 5, selected from a bank, such as that of FIG. 9.

Reference is now made to FIGS. 8 and 9 and 10, which indicate schematically the use of holograms as the unique authenticating master coded patterns. FIG. 8 illustrates schematically apparatus for the preparation of a hologram, using a spot pattern object, and an amplitude coded reference beam.

The laser 352 provides a beam 354 of coherent radiation. The beam splitter 356 provides two coherent beams, 358 which becomes the object beam, and 370 which becomes the reference beam. The object beam 358 passes through optics 360 to provide an expanded collimated beam 362 which passes through object plate 364.

Object plate 364 can be a fixed plate of any desired transparency pattern. Or it can be a transparent spot pattern. Also, it can be a fixed plate which would be the same for all holograms, or it can be a different plate, or a series of plates, such as on a film strip, 380, having supply and takeup reels 364A, 364B, for example, as would be well known to the man skilled in the art. As a type of hologram system, reference is made to U.S. Pat. No. 3,560,071.

The coded object beam then passes through optics 365 located at its focal length from the object plate 364, to form beam 366, which then impinges on a photosensitive web or film 368. The optics 365 can be conventional to provide a Fresnel, or a Fraunhofer hologram, as shown in FIG. 8, as is well known in the art.

The beam 370 is reflected by means of mirror 372 to form beam 373, which passes through optics 374 to form expanded collimated beam 376, which then passes through coding mask 380. The mask or film 380 is shown in FIG. 9, which is a film strip having a column of frames 384A, 384B, 384C etc, with a corresponding series of frames 386A, 386B, 386C etc. The frames 384 are reference beam coding transparencies, each having a unique pattern of transparent and opaque areas. These will be used to code the reference beams.

Corresponding to each unique coding pattern is a line or bit pattern which represents an index of the various coding patterns. For example, when a card is presented to the access authentication apparatus, the index number on the card will control the selection of the corresponding coding pattern of a reference beam, and so on. Servo apparatus for selecting the proper frame corresponding to the particular index number is well known and need not be described further.

The coding patterns of the reference beams can be amplitude or phase coding patterns, as are well known. Also the optics used can provide Fresnel or Fraunhofer holograms, as are well known in the art.

It is well known in optics, that the simultaneous irradiation of a photographic film with a coherent object beam and reference beam will provide a stationary interference pattern of the two coherent beams, which interference pattern is recorded on the film as a hologram. When the film is developed it becomes a hologram, which can be replaced at its original position 368. When irradiated by the same reference beam 392 alone, (the object beam being cut off by mask 359) will reconstruct an image of the original object plate or film 364. One image can be viewed by eye, as is well known and/or the other image can be brought to a real focus. If the object 364 is a pattern of bright spots, then the reconstruction will be the same pattern of bright spots. These spots can be detected by a corresponding pattern of photocells, sensors, or receivers 396, as is well known in the art. By the signals created in the sensors 396, the pattern of spots can be automatically read and identified, and so on, and compared with the pattern of the original object plate.

In this invention it is an object to provide an access card which has an index, which is machine readable, and a transparent or reflective hologram. The hologram is prepared in an apparatus like FIG. 8, with a unique coded reference beam made by a specific frame 384, corresponding to the index number corresponding to that on the card.

When the card is presented for access, the index is read, the particular reference beam coding pattern 384 is selected and placed in position to code beam 392. The card is positioned at 368 and the coded reference beam 392 impinging on the hologram on the card will reconstruct the object pattern image 394 which is focussed by lens 395 on the sensors 396, and authenticate the card. If the proper pattern is not authenticated, then access is not granted, and the card may be confiscated.

So far we have discussed several unique elements of the system;

(a) the unique coding pattern of the reference beam. This is selected from a bank of coding patterns by use of the index read from the card.

(b) the unique hologram which was recorded by the unique coded reference beam, the coding pattern of which corresponds in the bank to the index on the card.

(c) the spot which is the object coding pattern. A plurality of unique object patterns can be provided. When the card is presented for access authentication, the reconstructed object pattern must correspond to a preselected pattern. For example, the user may punch into a data entry device 268 a coded number of PIN number which can be compared to the reconstructed pattern.

FIG. 10 illustrates another embodiment in which the card 404 carries a unique machine readable index, a reference beam coding pattern 410, and a hologram 408 constructed using that reference beam coding pattern 410, and an object beam coded by a unique spot pattern 364 of FIG. 8, selected from a bank, such as a film strip similar to that of FIG. 9.

When the card 404 is presented for authentication, it is positioned in a laser beam 406 provided by laser 400 and optics 402. This produces a coded reference beam 412, which is reflected from mirrors 414, 416, and passes through optics 418, and as beam 422 impinges on the hologram 408. This reconstructs the hologram and an image is formed by beam 424, in the form of a spot pattern which falls on a bank of sensors 426. This pattern is then compared to the pattern stored in the bank corresponding to the index number on the card, or compared to a PIN number entered into 268 and so on.

It will be clear that the embodiments of FIGS. 4, 8 and 10 each have unique advantages. FIG. 4, for example, can be presented at a remote terminal which is simple in construction and can be connected to the control apparatus by wires. The index and the magnetic patterns can easily be copied. However, the apparatus of FIG. 4 has the advantage that the magnetic pattern can be changed to a different unique pattern each time the card is presented. Since the card can be presented as frequently as desired, this feature effectively prevents use of a nonauthorized facsimile card. Furthermore the magnetic card reading means is simple, such that a very simple and compact assembly can be provided, that will read the card and write its new number. Such a simple accessory can be carried in a brief case, etc. and utilized in conjunction with telephone lines to a remote control point. By this means, authenticated access can be gained to confidential information, or data from a computer, etc.

With the apparatus of FIGS. 8, 10, the card has the advantage that the hologram pattern is unique, and cannot readily be copied. In that sense it has greater security than the magnetic card of FIG. 4. However, the cards of FIGS. 8 and 10 require more extensive card reading and authenticating apparatus, and may require a bank of reference beam coding patterns, which means that the apparatus of FIG. 8 is most effective when the point at which access is desired is at the location of the bank.

On the other hand, the card of FIG. 10 is not readily copied and does not require a bank at the point where access is desired. The reconstructed point pattern can be scanned and transmitted by wire to the remote bank location, and so on.

It will be clear that the card can be a physical, stiff card of paper, plastic or metal, or it can be a key having a unique pattern such as is designed to open a specific lock, or a token of any type. The key can be of nonmagnetic metal, with the pattern serving as the unique index. A relieved portion of the flat surface of the key can be coated with magnetic material, on which a unique bit pattern can be recorded. Such a key can be used with the apparatus of FIG. 7 for example, with FIG. 4. This can be used for safe deposit boxes, automobile locks, hotel rooms, etc.

The configuration of FIG. 8 represents a complete hologram reading and recording system, where both the object beam 366 can be coded by means 364, and the reference beam 392 can be coded by means 378. Using the coded object and reference beams a hologram 368 is recorded, and, after chemical development, is mounted in the access card. The unique index on the card can be that corresponding to the storage address of the coding pattern 364 of the object beam, or the reference beam coding pattern 378. To reconstruct the hologram only that part of the system of FIG. 8 that includes the reference beam 392, the card hologram 368 and the image sensors 396 are required. The pattern on the image sensors will correspond to the particular object beam coding pattern used.

In the system of FIG. 10, the reference beam coding pattern used to record and reconstruct the hologram is on the same card 404 as the hologram. In this system, the unique index would correspond to the particular coding pattern of the object beam.

It is well known in optical holography that with selected different object beams, and a selected reference beam, different holograms can be recorded with the same reference beam, provided that the angle at which the reference beam reaches the photo sensitive medium is different for each hologram. In FIG. 10, the dashed line 404A is used to represent this factor of angle, by rotating the plane of the hologram 408 to different angles of azimuth and/or elevation. These angles can correspond to specific PIN numbers that can be punched in to the data entry means 268 to set the angle of the film, while recording the hologram in FIG. 8, a and in reconstructing the hologram in FIG. 10.

The various possible factors that can be used are:

(a) coding spot pattern of the object beam and comparing the reconstructed image with the object beam coding pattern.

(b) coding spot pattern of the reference beam, and selecting the proper coding pattern by the index to reconstruct the object pattern.

(c) as in (b) and comparing the object coding pattern with the reconstructed image.

(d) mounting the reference beam coding pattern and the hologram on the card, and comparing the image with the object coding pattern.

In FIG. 4, we have taught the procedure of changing a unique number on a card and in the bank each time a card is authenticated. In the prior art it is customary to use an index number on a card in cooperation with a PIN number punched in by means of data entry means 268. As part of this invention we utilize this basic system and add to it the feature of changing the PIN number each time the card is used and authenticated. This would call for a visual indicator like 452 of FIG. 4 which is set by signals received over dashed line 450 from line 252. The card user would read the new number, and make a record, if necessary, for future use, and on the next time the card is used, the new PIN number would be entered, and so on. A new PIN number can of course constitute an old PIN number, with the same digits arranged in a different order, and so on.

In the system of FIG. F, it will be clear that as the unique master coded magnetic bit pattern or number is changed on the card 224 and in the bank 214 each time the card is authenticated, a record can be kept of each of the numbers so that the complete sequence of numbers can be recalled as may be desired.

Our invention provides an access authenticating system which comprises in one embodiment: stored means to be retrieved and corresponding to an unique coded pattern; a plurality of authenticating unique coded master patterns on carrier means; means responsive to machine readable information indicative of the unique coded pattern; means responsive to the machine readable information to select the appropriate one of the plurality of authenticating unique coded master patterns; and means for comparison of the unique coded pattern corresponding to the stored means with the appropriate authenticating master pattern matching the selected unique coded master pattern. When the compared patterns match, means are provided to authorize access.

Other embodiments of our access authenticating system includes means for delivery of a stored item corresponding to the coded micro pattern and wherein the carrier means may include redundant coded master patterns; and wherein the means for delivery of the stored item comprises a currency dispenser (which are well known to the art) responsive to the machine readable information; Further, the stored means to be retrieved comprises a coded packet of currency from the currency dispenser.

Additional embodiments of our invention include the system wherein the unique coded pattern is derived from the authenticating group comprising the machine readable information, a signature of one having right of access, and a physical characteristic, such as a finger print. The stored means may be a light spot record of an unique article producing a characteristic pattern when exposed to substantially coherent radiation in a known and reproducible manner; further, the light spot record can be produced by exposing a light transmitting and refracting article, with means for comparing the produced light spot record with the stored means which comprises a master light spot record of said article; and wherein the means for comparison of the light refracting and reflecting article spot record.

Thus our invention contemplates provision of a "bank" of gem-produced light spot patterns; and the stored means to be retrieved are such patterns, and the machine readable information may comprise assigned certificate number for the particular gem to be identified or authenticated. We also contemplate an authenticated "print out" of a plastic replica of the gem, this by means known to the art for the reproduction of three dimensional articles by holographic techniques.

In this embodiment of the invention we provide an identity confirmation system which includes stored means to be retrieved from a bank of unique coded patterns comprising light spot records of unique articles which produce identifying and characteristic patterns of light spots when exposed to substantially coherent radiation in a known and reproducible manner. Means responsive to machine readable information is indicative of the unique coded pattern associated with the article or articles of interest; and the responsive means selects the appropriate one of the plurality of unique coded patterns. The system then utilizes means for comparison of the selected unique coded pattern with the produced pattern of the article to be identified; and means are provided to confirm identity of articles when the compared patterns match.

The system further is one wherein the light spot record and the test patterns are produced by exposing a light transmitting and refracting article (such as a cut gem) to substantially coherent radiation in a known and reproducible manner and the means for comparison of the produced light spot record with the stored means includes means to print out the matched light spot record of the article. Alternatively, the system is one wherein the means confirming identity includes holographic means to produce a hologram corresponding to the unique article.

We claim:

1. A system for access control, for selectivley granting access on presentation and authentication of a control token, said system comprising:
   A. a bank comprising
      (1) storage means for storing a plurality of unique authenticating master coded bit patterns, each in different address locations; said coded bit patterns comprising magnetically altered areas;
      (2) a plurality of address locations in said storage means, each address being an index of the bit pattern stored therein; and
      (3) means to produce a plurality of unique bit patterns;
   B. a plurality of control tokens, each control token comprising
      (1) an unique object;
      (2) means on said object for storing in machine readable form an unique index;
      (3) means on said object for storing in machine readable and machine writeable form an unique coded bit pattern;
      (4) each of said control tokens having one of said unique indicia and the corresponding unique authenticating coded bit patterns stored in said bank;
   C. reading means to which a control token can be presented, said reading means including first means to read said indicium, and second means to read said coded bit pattern on said token;
   D. means responsive to said first means to select from said bank said coded bit pattern corresponding to said indicium;
   E. means to compare the unique bit pattern read from said token with the stored bit pattern in said bank corresponding to the read indicium, and
   F. means responsive to said comparison means to select a different unique bit pattern from said means to produce, and to write a new unique bit pattern on said token and in said bank in an address corresponding to said indicium on said token.

2. The system as in claim 1 which includes means to relatively scan a magnetic reading and writing means along said token over said magnetically altered areas.

3. The system as in claim 1 which includes a plurality of individual magnetic sensor elements in fixed linear array, which array is congruant with the array of bits in said bit pattern.

4. The system as in claim 3 including means to relatively oscillate said array of sensors and said token, in the direction of said array, whereby bit signals will be generated in said sensor elements in accordance with said bit pattern.

5. The system as in claim 3 and including means to demagnetize said magnetizable material.

6. The system as in claim 5 including means after said magnetizable material is demagnetized, and said relative oscillation is stopped, of applying a writing signal to a selected number of said plurality of sensor elements to record a new bit pattern on said magnetizable material.

7. The access control system of claim 1 including a plurality of control tokens, each comprising
   (1) an unique object compatible with the system;
   (2) each said object having thereon in machine readable form an index to one of said coded bit patterns in said storage system;
   (3) each said object having thereon in machine readable and writeable form an unique bit pattern comprising an alterable memory access means;
   (4) each of said control tokens having one of said address locations thereon to index the corresponding stored authenticating master coded bit pattern.

8. The system of claim 1 including means for substituting for said alterable random access memory another bit pattern from said storage means whereby data stored may be read, written, or updated upon presentation of the control token having the altered access memory.

9. The system of claim 1 wherein said coded bit patterns comprising the magnetically alterable areas may be altered by means including means to produce a selection of unique bit patterns on said token; and means responsive to said comparison means to select a different unique bit pattern in said alterable access memory on said token and in said storage means.

* * * * *